United States Patent [19]
Reed et al.

[11] 4,080,151
[45] Mar. 21, 1978

[54] FURNACE PRESSURE SENSOR
[75] Inventors: Robert D. Reed; Vernon A. Street, both of Tulsa, Okla.
[73] Assignee: John Zink Company, Tulsa, Okla.
[21] Appl. No.: 651,294
[22] Filed: Jan. 22, 1976
[51] Int. Cl.[2] .............................................. F23N 5/24
[52] U.S. Cl. ..................................................... 431/13
[58] Field of Search ........................ 431/13, 16, 22, 77

[56] References Cited
U.S. PATENT DOCUMENTS

| Re. 28,013 | 5/1974 | McLarty | 431/16 X |
|---|---|---|---|
| 3,537,803 | 11/1970 | Ignazio | 431/22 |

Primary Examiner—Alan Cohan
Assistant Examiner—Gerald A. Michalsky
Attorney, Agent, or Firm—Head, Johnson & Chafin

[57] ABSTRACT

A system for creating an alarm whenever the pressure inside of a combustion furnace is higher than atmospheric pressure. The system uses a pressure reference comprising a chamber which is designed to average out momentary wind-induced fluctuations of pressure in the atmosphere and to provide a substantial volume of air inside the chamber which is maintained at an average value of atmospheric pressure. A conduit is passed through the wall of the furnace to the point under the furnace arch where the pressure is to be measured. This conduit is connected by a tubing to the chamber. A temperature sensing means is inserted in the conduit so as to measure the temperature of gas flowing through the tubing from, or to, the furnace. Normally, because of the draft in the furnace, air will flow from the chamber to the furnace. Whenever the pressure in the furnace is greater than atmospheric, hot furnace gases will flow in the reverse direction and the temperature sensor will indicate this flow and cause an appropriate alarm or alarms.

12 Claims, 2 Drawing Figures

FURNACE PRESSURE SENSOR

BACKGROUND OF THE INVENTION

This invention lies in the field of fuel combustion apparatus. More particularly, it concerns the burning of fuels in furnaces. Still more particularly it concerns apparatus for sensing the pressure inside of the furnace, and causing an alarm whenever the furnace pressure exceeds atmospheric pressure.

In the process arts, where heat is released into a furnace to transfer to tube-contained fluids, it is common to rely on furnace "draft" for the induction of air which is required for fuel combustion. In such furnaces, it is harmful, and wasteful of fuel, when the pressure inside the furnace becomes greater than atmospheric pressure. In the normal terminology, a condition of "draft" means less than atmospheric pressure exists within the furnace. A condition of "pressure" means greater than atmospheric pressure within the furnace.

It is common at times for furnace pressure to exist without the knowledge of the furnace operators, and consequently fuel is lost, and furnace damage can occur, because the very hot furnace gases are forced outwardly through openings in the furnace structure. There is particular damage to the furnace roof, or more properly the furnace arch, where the greatest furnace pressure exists. Furnace draft increases with movement down the furnace, and decreases with movement up the furnace. Minimum draft at any point in the furnace and at any time, should be at least 0.03 W.C. Reference is made to *Furnace Operations*, by Reed, Gulf Publishing Company, page 84, Library of Congress card 72-84333.

Wind induced changes in atmospheric pressure far exceed 0.03 W.C. as they occur, and in the measurement of comparative furnace and atmospheric pressures, stabilization of atmospheric pressure is required. On page 93 of *Furnace Operations* there is shown means for piezometric stabilization of atmospheric pressure, as indicated by a gauge or manometer. The same device is required for atmospheric pressure stabilization for the indication of furnace pressure with the difference that, for pressure indication, there is gas movement, but in draft measurement there is no gas movement.

SUMMARY OF THE INVENTION

It is a primary object of this invention to provide an apparatus which can be installed in a furnace, whereby indication will be provided whenever the pressure inside the furnace is greater than atmospheric pressure.

This and other objects are realized and the limitations of the prior art are overcome in this invention by providing a chamber which is maintained at a pressure equal to the medium term, average value of atmospheric pressure. This is a chamber of substantial volume, which is closed except for a connection to a tubing means at the bottom, and a plurality of small orifices near the top. This is placed in an open area, away from buildings, and particularly away from the furnace. The effect of wind blowing over the chamber is minimized, and the large volume of air inside the chamber acts as a means to average the atmospheric pressure over a period of time, which is very long compared to the time of individual gusts of wind.

A conduit is inserted through the wall of the furnace, to a selected point where the pressure in the furnace is to be measured. The outside end of the conduit is connected to the chamber by a tubing means. If the pressure in the furnace is lower than atmospheric pressure, as provided by the air pressure inside of the chamber, then there will be a continued flow of air through the orifices into the chamber, from the chamber through the tubing, and from the tubing through the conduit into the furnace. However, if at any time the pressure inside the furnace becomes greater than atmospheric, the flow of gas will be reversed, and hot combustion products from the furnace will flow through the conduit and the tubing of the chamber.

A temperature sensor is inserted into the system, preferably at the junction between the conduit and tubing. The sensor senses the temperature of the gas passing from or to the tubing. When the temperature of the gas is high it is an indication that the pressure in the furnace is greater than atmospheric pressure, and an appropriate alarm can be caused.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figures 1, 2:
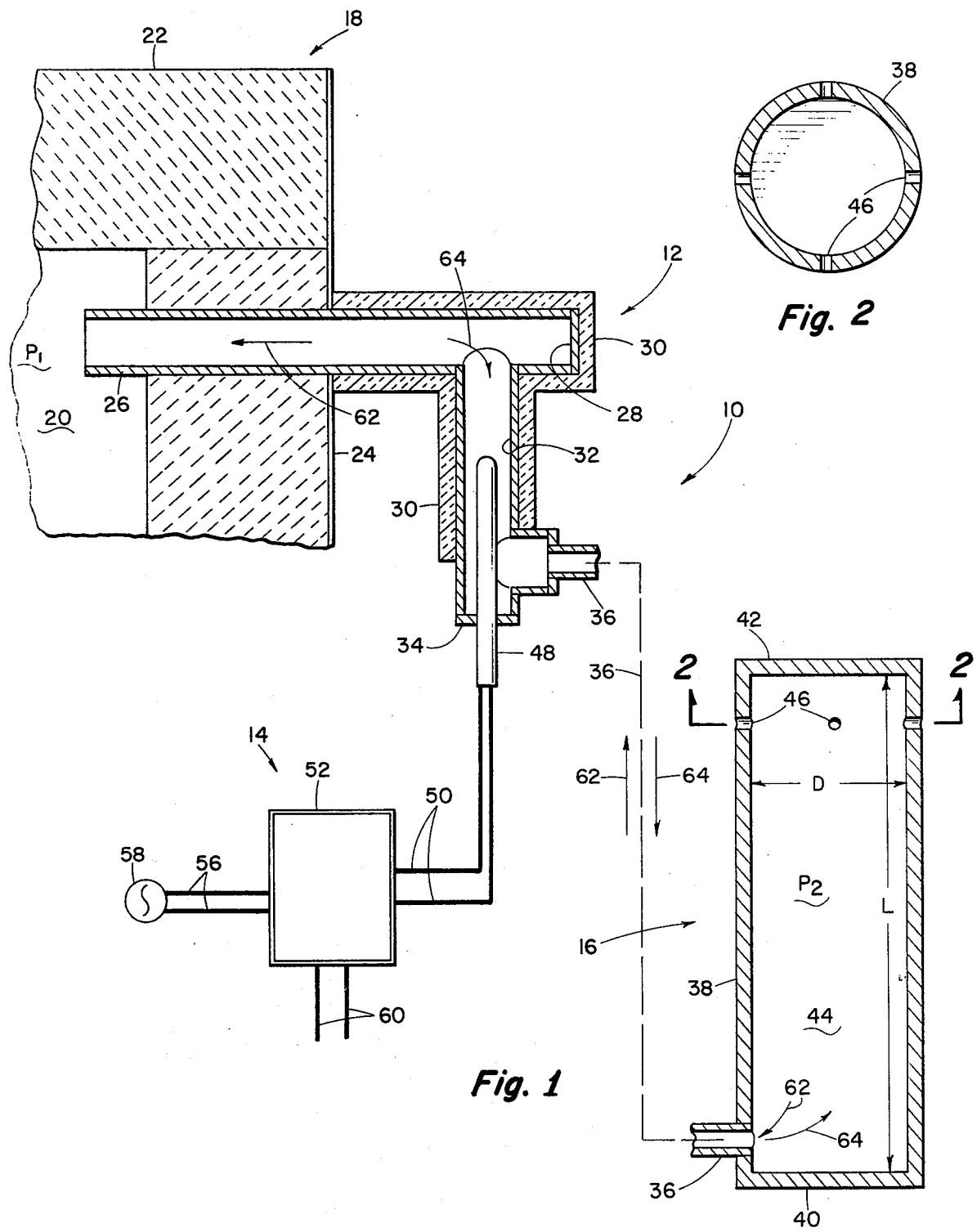
FIG. 1 illustrates one embodiment of an alarm system for detecting furnace pressure greater than atmospheric pressure.
FIG. 2 illustrates a cross-section through the chamber of FIG. 1 taken at the plane 2—2.

Referring now to the drawing and in particular to FIG. 1, there is shown one embodiment of a system indicated generally by the numeral 10. This system comprises several parts. There is a sampling portion indicated generally by the numeral 12, an alarm system indicated generally by the numeral 14 and a pressure reference portion indicated generally by the numeral 16.

A furnace indicated generally by the numeral 18 comprises a roof or arch 22, and a wall portion 24, and other portions which are not shown but well known. These enclose a combustion volume 20 which has an internal pressure P1. It is desired to measure the pressure P1 and to sound an alarm whenever the pressure is greater than the pressure P2 in the chamber 16, which is designed to provide a pressure equal to the short time averae of the pressure of the atmosphere.

The detection portion 12 of the system 10 comprises a conduit or pipe 26 which is inserted through the wall of the furnace to the point at which the pressure is to be measured. This pipe extends out from the wall of the furnace, and has a side arm 32. The pipes 26 and 32 are covered by conventional insulation 30. The end of the pipe 26 is closed and the junction point at which the pipe 32 is joined is displaced some distance from the end 28. A thermal sensor 48, such as a thermocouple, is inserted into the pipe 32 at a point near the end 34 of the pipe, where a tubing 36 is joined to the pipe.

A pressure reference device, or chamber 16, is provided such that the pressure P2 in the volume 44 inside of the housing 38 will be substantially equal to the medium term average of the instantaneous atmospheric pressure. The chamber 16 comprises a tubular portion 38 with a bottom end 40 and a top end 42 which are both closed. There is a means for coupling the tubing 36 at the bottom of the chamber. Near the top of the chamber are a plurality of small orifices 46 which are circumferentially placed. These are shown more clearly in FIG. 2 which is a section taken along the plane 2—2 of FIG. 1. These openings 46 are small, and the total cross-section area of the openings should preferably be less than 1% of the cross-sectional area of the chamber. In general, the length to diameter ratio (L/D) of the chamber should be at least 1, and preferably greater.

The purposes of the chamber 16 is to provide a large stable volume of air which is connected to the atmosphere through a plurality of small openings 46. Whenever a gust of wind occurs wherein the pressure of the atmosphere is momentarily increased, or decreased, air will flow into (or out of) the chamber through the orifices 46. Because the flow of air through the orifices is limited, the total mass of air in the chamber cannot be altered rapidly. Thus, in the long run, the reference pressure P2 inside the chamber will be an average of the atmospheric pressure. The period of time over which the average takes place is a function of the size of the openings 46 in reference to the total volume of air of the chamber. This ratio should be great enough so that the average will cover a period of several successive gusts of wind. The chamber 16 is preferably mounted with a vertical axis.

Since atmospheric pressure varies greatly in the vicinity of buildings or obstructions, due to the wind striking critical surfaces etc., the chamber should preferably be placed in an area displaced from the furnace itself or from structures, since adverse wind conditions might upset the $P_1$–$P_2$ relationship to either cause an unjustified alarm or fail to cause an alarm at a time when it is justified.

The pressure $P_1$ inside of the furnace is either a "draft" pressure less than atmospheric, or it is a furnace "pressure", which means that it is greater than atmospheric pressure. The pressure of the atmosphere will be considered as the pressure $P_2$ inside of the chamber 16, which has been designed to be relatively insensitive to the pressure variations resulting from gusts of wind and other air disturbances.

When $P_1$ inside of the furnace is less than atmospheric pressure, air is caused to flow from the chamber 16 through the tubing 36 into the pipe 32, and the pipe 26, into the furnace 20. This air flow is cold, and the temperature sensor, such as the thermocouple 48, will indicate a low temperature. No alarm will be sounded since none is required. If however, $P_1$ is greater than atmoshperic pressure, the flow of gas through the tubing 36 will be from the furnace through the pipes 26 and 32 and through the tubing into the chamber 16 thence to the atmosphered via ports 36. This flow of gas from the furnace will be very hot, and as it flows over the thermocouple 48, will increase the voltage output, and therefore operate an alarm.

The leads of the thermocouple 48 are indicated by the numeral 50 which go to a voltage sensing device 52 of conventional design, which provides contacts which close and apply power to a signal or alarm 58 over the leads 56. Power for operating the signaling system is received over the leads 60 in a conventional manner. Since there will be a great difference between the temperature of the gas flowing over the thermocouple when it flows from the furnace to the chamber as compared to when its flows in the normal manner from the chamber to the furnace, it will be reasonably convenient to create an alarm based on the electrical potential supplied to the thermocouple.

The construction of the pipes 26 and 32 is such that the thermocouple must be hidden from direct radiation that might be received from the interior of the furnace, since what is required is a measure of furnace gas temperature. Thus, the pipe 32 is attached some distance away from the end wall 28 of pipe 26, so that reradiation from the wall 28 will not directly reach the thermocouple 48 which is positioned at some distance down the pipe 32.

It is clear that other sensors than a thermocouple, and other configurations of piping can be provided, which will work as effectively as that shown in FIG. 1. The principal factor to be kept in mind is that the temperature measuring sensor must measure only the temperature of the gas, and must not be effected by the constant radiation from the interior of the furnace.

The sizes of pipes 26 and 32, the size of the tubing 36, and the size of the chamber 16 are not critical. However, the cross-sectional internal area of the chamber 16 should be at least 100 times, or more, the total cross-sectional area of the openings 46. The larger the ratio the better, since it will provide a more constant average value of atmospheric pressure, irrespective of the effects of wind and other similar disturbances. The pipe 38 or tubular means, or cylindrical wall of chamber 16 may be 1 inch or more in diameter, the tubing 36 could be $\frac{3}{8}$ inch OD or larger and the pipes 26 and 32 can be any convenient size.

Since there will normally be a flow of air from the chamber 16 through the tubing 36 and pipes 32 and 26 to the space 20, there will be a very slight underpressure below true atmospheric pressure in space 44, which is sufficient to induce flow into 44 through orifices 46 but not great enough to interfere with use of the pressure in 44 as a reference for undisturbed atmospheric pressure.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency of which each element or step thereof is entitled.

What is claimed is:

1. An alarm system for sensing a condition of over-atmospheric-pressure in the furnace which depends on draft-induced combustion air, comprising:
   a. chamber means maintained at a pressure substantially equal to the average value of atmospheric pressure;
   b. conduit means through the wall of said furnace to the point at which pressure measurement is desired;
   c. tubing means connecting said conduit means to said chamber means; and
   d. temperature sensing means exposed only to the temperature of the gas which flows through said tubing means either from or to said furnace;
      whereby when gas flows from said furnace through said conduit means to said chamber means, it will indicate that the pressure inside said furnace is greater than atmospheric pressure, and the high temperature of the gas will be sensed by said temperature sensing means; and wherein
   e. said chamber means comprises a tubular means, of selected length to diameter ratio, closed at both ends, means at one end to connect said tubing means, and a plurality of small ports arranged circumferentially near the second end.

2. The alarm system as in claim 1 in which said length to diameter ratio is at least 1.

3. The alarm system as in claim 1 in which said length to diameter ratio greater than 1.

4. The alarm system as in claim 1 in which the total cross-sectional area of said plurality of ports is less than 1% of the cross-sectional area of said chamber.

5. The alarm system as in claim 1 in which said chamber means is positioned with its axis vertical and said orifices at the top.

6. The alarm system as in claim 1 in which said chamber means is positioned in an outdoor area at a distance from said furnace and in an unobstructed area.

7. The system as in claim 1 in which said conduit means comprises;
 a. a first pipe through said wall, and closed at its outer end;
 b. a second pipe at right angle to said first pipe at a selected distance from said closed end;
 c. said tubing means connected at the end of said second pipe.

8. The system as in claim 7 in which said temperature sensing means is positioned inside said second pipe near the junction with said tubing means.

9. The system as in claim 1 in which said temperature sensing means comprises thermocouple means.

10. The system as in claim 1 including alarm means resposive to said temperature sensing means.

11. An alarm system for sensing a condition of over-atmospheric-pressure in a furnace which depends on draft-induced combustion air, comprising:
 a. conduit means through the wall of said furnace to the point in said furnace at which pressure measurement is desired;
 b. said conduit means comprising:
  1. a first pipe extending from said furnace, through said wall, to a point outside said wall and closed at its outer end;
  2. a second pipe outside said wall, and connected at a right angle to said first pipe at a selected distance from said closed end;
  3. said second pipe at its second end open to the atmosphere outside said wall; and
 c. temperature sensing means installed in said second pipe and exposed only to the temperature of the gas which flows through said second pipe either from or to said furnace;
 whereby when gas flows from said furnace through said conduit means to said atmosphere, it will indicate that the pressure inside said furnace is greater than the pressure of the atmosphere surrounding said furnace, and the high temperature of the gas will be sensed by said temperature sensing means.

12. The alarm system as in claim 11, and including chamber means which comprises a tubular means, of selected length to diameter ratio, closed at both ends, means at one end to connect said tubular means with said second pipe, and a plurality of small ports arranged circumferentially near the second end of said tubular means.

* * * * *